United States Patent [19]

Posedel

[11] Patent Number: 4,831,295
[45] Date of Patent: May 16, 1989

[54] ARRANGEMENT FOR REDUCING SHAFT VOLTAGES IN DYNAMOELECTRIC MACHINES

[75] Inventor: Zlatimir Posedel, Neuenhof, Switzerland

[73] Assignee: Asea Brown Boveri AG, Baden, Switzerland

[21] Appl. No.: 122,037

[22] Filed: Nov. 17, 1987

[30] Foreign Application Priority Data

Nov. 19, 1986 [CH] Switzerland ............... 4620/86

[51] Int. Cl.$^4$ .................. H02K 5/24; H01H 9/48; H01R 39/02
[52] U.S. Cl. ....................... 310/72; 310/221; 361/212
[58] Field of Search ........... 310/72, 220, 68 R, 90, 310/71; 361/1, 23, 159, 212, 221; 363/53

[56] References Cited

U.S. PATENT DOCUMENTS 4,535,377 8/1985 Lane .......................... 361/1

FOREIGN PATENT DOCUMENTS 2034883 1/1972 Fed. Rep. of Germany .
3511755 10/1985 Fed. Rep. of Germany .
1508793 4/1978 United Kingdom .

OTHER PUBLICATIONS

Posedel et al., "Shaft Voltages in Turbosets", Swiss Federal Inst. of Tech.

Primary Examiner—Patrick R. Salce
Assistant Examiner—D. L. Rebsch
Attorney, Agent, or Firm—Oblon, Fisher, Spivak, McClelland & Maier

[57] ABSTRACT

An arrangement for reducing voltages appearing in turbosets, wherein in addition to a grounding brush (7) on the drive end (DE), another (18) grounding brush is provided on the nondrive end (NDE) and is connected to ground (5) by an RC element (19,20). In this way, when grounding brush (7) on the drive end malfunctions, static charges and alternating frequency currents are reliably discharged.

The currents flowing on the nondrive end and the voltages appearing between grounding brush (18) and ground (5) further allow reliable statements to be made about the operational capability and operational safety of the shaft grounding.

16 Claims, 2 Drawing Sheets

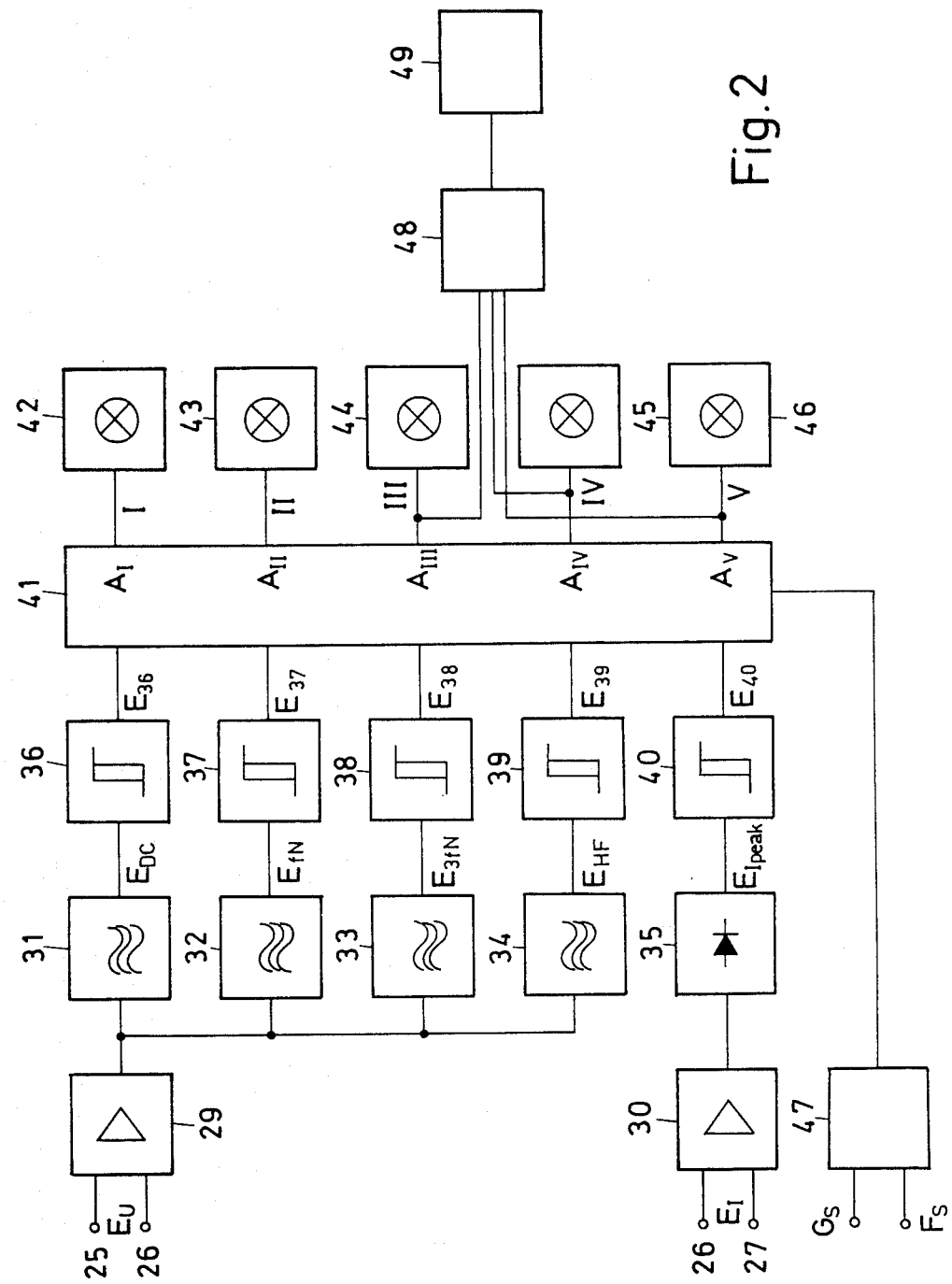

ARRANGEMENT FOR REDUCING SHAFT VOLTAGES IN DYNAMOELECTRIC MACHINES

TECHNICAL FIELD

The invention relates to an arrangement for reducing the shaft voltages in dynamoelectric machines, especially turbosets, in which on the nondrive shaft end of the machine, whose shaft is galvanically separated by insulating distances from ground, frame and foundation, a current path comprising a contact device and a capacitor connected to it in series is provided between the shaft and machine foundation or ground.

An arrangement for reducing shaft voltages with these features is known, for example, from DE-OS No. 35 11 755.

TECHNOLOGICAL BACKGROUND

The shaft voltages occurring in electric machines, especially turbosets, are a potential danger for numerous components of the shaft assembly. If uncontrolled electric circuits develop, the parts lying in these paths could be damaged by the effect of current and by spark erosion. The consequences of damage from shaft voltages were able to be safely eliminated by two generally known measures:

Barriers were made by inserting insulating distances so that the direct-axis voltage of the shaft cannot drive any damaging current over the endangered parts. As a rule these insulating distances, especially in turbosets, are placed only on the nondrive end (NDE) of the electrical machine (generator). A consistent insulation of all potentially endangered parts of a steam turbine or those of motor-driven machines would hardly be feasible.

By grounding the shaft on the noninsulated drive end (DE) with grounding brushes so that the shaft is solidly connected to ground potential.

With the introduction of static excitation systems and static cascade connections, a new source of shaft voltage with steep voltage peaks has been added. These steep voltage peaks so greatly impair the grounding brushes, which are operating under less favorable conditions, due to the high surface speeds, and which are on the drive end (DE) of the dynamoelectric machine, that they become ineffective in relatively short time. The steep and high voltage peaks then lead to capacitive displacement currents on the insulating distances of the machine components and to the breakdown of lubricating oil films. The current pulses triggered by the voltage peaks can cause a spark erosion in the bearings of the shaft assembly.

To remedy such difficulties, it is suggested in DE-OS No. 35 11 755 that the "ohmic" grounding brushes placed on the drive end of the electric machine be relieved by providing, on the nondrive end, on which the bearings are galvanically separated from ground, frame and foundation by insulating distances, a current path comprising a contact device with at least one sliding contact and a capacitor connected to it in series between the sliding contact of the shaft and the machine frame or ground.

However, since safe ohmic grounding of the shaft on the drive end of the shaft assembly cannot be attained due to unfavorable contact relationships in conventional machines, and additionally due to inaccessibility in nuclear power plant machines, the discharge of static charges and capacitively coupled voltages can no longer be guaranteed.

BRIEF DESCRIPTION OF THE INVENTION

Starting with prior art, the object of the invention is to reduce all voltage peaks coupled in by static excitation systems or by interference voltage to the extent that these voltage peaks cannot become a danger to the components of the shaft assembly and to connect the shaft by direct current with potential to ground, to prevent a buildup of electrostatic charges in the shaft.

This object is achieved with an arrangement for reducing the shaft voltages with the features of the generic concept of claim 1 according to the invention, by connecting an ohmic resistor on the nondrive end parallel to the capacitor.

In this way, the ohmic grounding on the drive end of the shaft can basically be dispensed with. An additional intentional or unintentional grounding of the shaft on the drive end, whether by grounding brushes or, in machines, by a place on the shaft with strips, does not have a deleterious effect, since possibly occurring circulating currents are limited in a safe way by the RC combination on the nondrive end and thus can cause no damage to the points of contact.

The ohmic resistor—its amount of resistance is of the magnitude of 100 to 10,000 ohms, preferably between 400 and 1000 ohms—in combination with a capacitor of suitable size—typically between 1 and 30 microfarads—provides a reliable connection between shaft and frame or ground, which reduces both static charges and low-frequency and higher frequency voltages to amounts that are safe for the bearings, and limits possible currents in the bearings to safe values.

The grounding of the shaft on the nondrive end of the dynamoelectric machine with a combination of capacitor and ohmic resistor has, in contrast to the other grounding, the great advantage that in this grounding, all those surrounding conditions that are required for an optimal sliding contact of the grounding brushes can be achieved.

The invention is thus based on the idea of shifting the contact problem of the grounding brushes from the drive end to the nondrive end, with the aim of achieving the optimal surrounding conditions for the sliding contact of the grounding brushes there, specifically low surface speed, undisturbed shaft surface. This grounding on the insulated nondrive end must then occur by an ohmic resistor, so that in case of a contact on the other shaft end of the generator or because of additional drive-end grounding brushes, no damaging currents of the induced, low-frequency shaft voltages can flow. With an additional capacitor that is connected parallel to the ohmic resistor, the alternating current component, especially the high-frequency component of the shaft voltage, is reduced to such a low level that the maximum shaft-ground voltage potential is below the value that is required for the formation of a spark erosion mechanism. Another advantage of the invention can be seen in the fact that it is possible, with comparatively simple means, to monitor the grounding brush contact and the entire shaft grounding. All components of the shaft voltage and the shaft current can be measured and relayed for evaluation to a central computer unit. The shaft current is determined with a current transformer placed on the drive end, or preferably a Rogowski coil on the shaft.

The analysis of a shaft assembly network model which simulated the discrete and distributed capacitors and inductors, as well as tests on large turbosets, showed that this grounding on the insulated nondrive end of the generator achieved its object in an outstanding way.

BRIEF DESCRIPTION OF THE DRAWING

The invention will be described in more detail below using the drawing. Shown are:

FIG. 2 A block diagram of an evaluation device for the currents flowing to the ground on the nondrive end of the shaft or the voltages occurring there.

DETAILED DESCRIPTION OF THE INVENTION AND ITS PRINCIPLES

Figure 1:
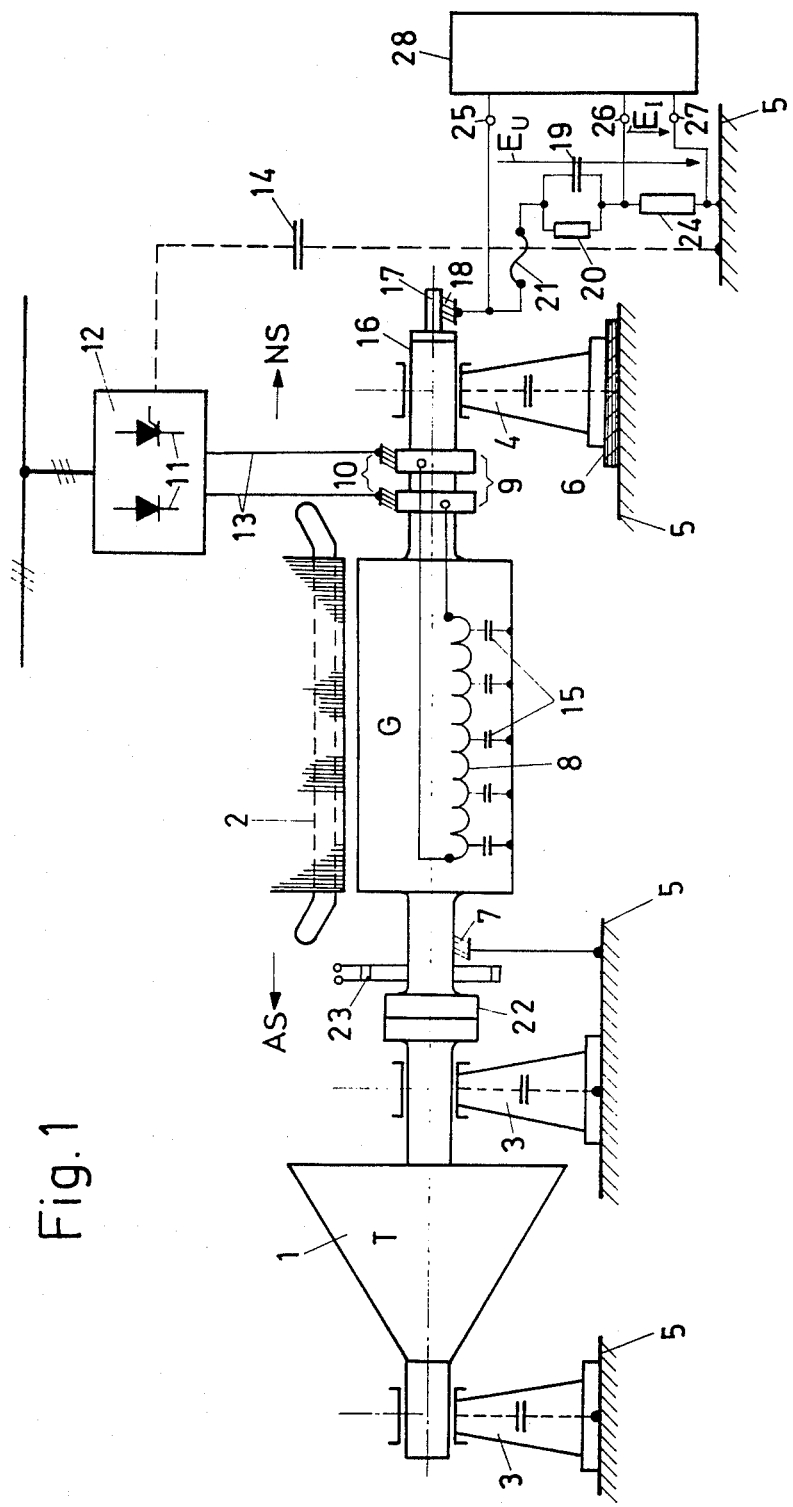
FIG. 1 A highly diagrammatic representation of a turboset with a device for shaft grounding.

FIG. 1 shows a turboset with a turbine 1 and a generator 2. However, instead of generator 2, another electric machine, e.g., a wound rotor induction motor, is possible and instead of turbine 1 any driven machine is possible. 3 designates the uninsulated bearings of the shaft assembly connected on the drive end and opposite grounding 5 (frame), 4 is the bearing connected on the nondrive end and insulated from ground 5 by a bearing insulation 6. On the drive end, the shaft assembly is ohmically grounded by a grounding brush 7. Rotor winding 8 is fed by slip rings 9 and current collecting brushes 10 by feeders 13 from supply system 12, which is static, i.e., equipped with semiconductor rectifier diodes 11 (shown only symbolically). During the commutation of semiconductor rectifier diodes 11, there occur in supply system 12 steep dU/dt edges that cause shaft voltage peaks by capacitive coupling capacitances to ground 14 of the supply system and distributed winding capacitances 15 of the rotor winding or that trigger rapid di/dt changes, which also lead to these shaft voltages by inductive coupling mechanisms.

According to the invention, on the nondrive end or on any shaft end 16 on which the bearings (sealing rings, etc.) are insulated by insulating distances 6 from ground 5, an additional grounding is provided which consists of a sliding contact with a rotating contact part on a shaft extension 17 and a stationary contact, e.g., brushes 18, a capacitor 19 and an ohmic resistor 20 connected parallel to it in series. The object of a fuse 21 connected in series to RC element 19, 20 is to prevent currents from flowing during an insulation defect in the ohmic resistor or in the capacitor, currents which, in this case, would have been driven by low-frequency direct-axis voltages. For this purpose, preferably time-lag fuses for as small a gate turn-off current as possible, but which do not affect the very short-time capacitive leakage currents, are used. The criteria below apply to the design of capacitor 19 and ohmic resistor 20:

On the one hand, this grounding should have as low an impedance as possible for discharging the steep voltage peaks; on the other hand, the current caused by low-frequency shaft voltage components (rotational frequency and harmonics) at a contact present on the other end, the drive end, should be small. Resistance values between 400 and 1000 ohms and capacitance values between 1 and 30 microfarads have proven to be especially appropriate here.

For the sliding contact in the by-pass circuit on the nondrive end, the requirements below must be met:

A small surface speed which, for example, can be achieved by shift extension 17 whose diameter is smaller than that of the shaft;

A surface of the rotating contact part that is structured to favor the discharge of short current pulses, for example by structuring the extension surface preferably according to FIG. 5 of DE-OS No. 35 11 755;

Brushes with constant mechanical and electrical features, e.g., those made of metallized carbon fibers or metal that are supported either radially or axially on shaft extension 17.

Further, in series with RC element 19, 20, there is a low-inductance shunt 24 for picking up all the shaft leakage current that flows from the nondrive end to the ground. An analysis unit 28, whose design is shown in FIG. 2, is connected by terminals 25, 26, and 27, which lead directly to brushes 18, the connecting point between RC element 20, 19 and shunt 24 or frame (foundation 5).

A current transformer, preferably a Rogowski coil 23, which surrounds the shaft between drive-end grounding brush 7 and coupling 22, also serves to pick up the shaft voltage and can be connected to a monitoring device.

Signals $E_U$ and $E_I$ that are present at RC element 20, 19 or shunt 24 are fed to the input of analysis unit 28, whose block diagram is shown in FIG. 2. Both signals are amplified wideband in amplifiers 29, 30. The output signal of amplifier 29 is fed to filters 31, 32, 33, 34. These filters are designed so that on filter 31 the direct current components $E_{DC}$ are filtered out, on filter 32 the line frequency components $E_{fN}$ are filtered out, on filter 33 the components $E_{3fN}$ corresponding to triple the line frequency are filtered out and on filter 34 components $E_{HF}$ that are more than triple the line frequency and that are significant for assessing the grounding status are filtered out.

To amplifier 30, a peak value detector 35 is connected in series, at whose output a signal $E_{Ipeak}$ corresponding to the peak value of the current flowing by shunt 24 is applied.

The output signals of all filters 31–34 and of the peak value detector 35 are fed to voltage comparators 36–40 with adjustable threshold. In this way, an evaluation based on amplitude can be made of the various components before the components are further analyzed or combined with one another. This is accomplished in an evaluation logic 41, which will be explained later. Output units 42 to 46 serve to indicate all relevant operating states of the shaft grounding.

To prevent false information from being indicated at the output units during startup or shutdown of the turboset, an electrical interlock 47 is provided which is activated by the generator master switch and/or generator field switch (neither shown in the diagram) by input signals GS or FS. The output signal of interlock 47 is applied to control inputs or interlock inputs of evaluation logic 41 and block its signal analysis or relay during the said operating phase.

To explain the operating method of analysis unit 28, Table 1 below will be more closely examined. It summarizes the various voltage and current components that were measured on the shaft grounding on the nondrive end of a large turbogenerator with rotating rectifier excitation and at different variants of the shaft grounding:

TABLE 1

| Type of Grounding | Voltage (V) | | | | Current (A) |
|---|---|---|---|---|---|
| | $U_{DC}$ | $U_{fN}$ | $U_{3fN}$ | $U_{HF}$ | $I_{peak}$ |
| A | 0.05 | 2.25 | 4.25 | 0.4 | 2.5 |
| B | 4.8 | 1 | 1 | 0.4 | 2.6 |
| C | 0.75 | 2.4 | 4.3 | 18 | — |
| D | 26 | 6.2 | 8.6 | 18 | — |

In the table

A represents the shaft grounding on the drive and nondrive end

B the shaft grounding only on the nondrive end

C the shaft grounding only on the drive end

D the ungrounded shaft $U_{DC}$ the direct current component $U_{fN}$ the line frequency component $U_{3fN}$ components of the third harmonic of the line frequency $U_{HF}$ the high frequency components $I_{peak}$ the peak value of the nondrive end grounding current.

A closer look at these values in the table already shows that, with a suitable analysis and combination of these measured values, clear statements can be made about the overall grounding relationships of the electric machine. These signals—suitably amplified—are in fact available in analysis unit 28 at the outputs of filters 31 to 34 or at the output of peak value detector 35. They are analyzed according to amplitude in comparators 36 to 40 connected in series. This analysis is generally done based on theoretical calculations and values gained in practical experience. In the turbogenerator whose measured values are shown in Table 1, these threshold values could, for example, be:

$U_{DC} = 2.0$ V (rms)

$U_{fN} = 1.5$ V (rms)

$U_{3fN} = 2.0$ V (rms)

$U_{HF} = 5.0$ V (peak)

$I_{peak} = 0.5$ A (peak)

If comparators 36 to 40 are set so that they supply a (logic) output signal 0 as long as these values remain below the threshold value and supply a (logic) output signal 1 when said threshold values are exceeded, then these threshold values can be combined with one another and analyzed in a simple way in the comparatively simply structured evaluation logic 41. This will be shown using Table 2.

TABLE 2

| Grounding Status | | | | | | Analyzed Measured Signal | | | | |
|---|---|---|---|---|---|---|---|---|---|---|
| Grounding NDE | | Brush DE | | Fuse NDE | | Voltage | | | Current | |
| ok | def | ok | def | ok | def | $E_{36}$ | $E_{37}$ | $E_{38}$ | $E_{40}$ | State |
| x | | x | | x | | 0 | 1 | 1 | 1 | I |
| x | | | x | x | | 1 | 0 | 0 | 1 | II |
| x | | x | | | x | 0 | 1 | 1 | 0 | III |
| x | | | x | | x | 1 | 1 | 1 | 0 | IV |
| | x | x | | x | | 0 | 0 | 0 | 0 | V |

In this table, $E_{36}$, $E_{37}$, $E_{38}$, $E_{40}$ represent the output signals of comparators 36, 37, 38, and 40. The binary combination 0111 represents state I, i.e., the contact of the two grounding brushes on the nondrive end and the drive end is alright, likewise the fuse 21. The binary combination 1001 (state II) signals that the grounding brush on the drive end is defective although the shaft grounding on the nondrive end is alright. The binary combination 0110, status III, signals a defect in fuse 21 but intact grounding relationships on the drive end and nondrive end. The binary combination 1110 signals an intact grounding brush on the nondrive end but defective grounding on the drive end and a similar fuse 21. The binary combination 0000 finally shows a failure of the grounding brush on the nondrive end.

The object of the evaluation logic, which is simple to make using means of prior art, is to recognize these five states and to relay to output units 42 to 46.

For example, of outputs $A_I$ to $A_V$, only outputs $A_{III}$, $A_{IV}$, and $A_V$ are connected by a data transmission device 48, for example a modem, to mainframe 49, because only states III, IV and V are critical for the shaft grounding, but all states can be relayed to the mainframe.

I claim:

1. Arrangement for reducing the shaft voltages on dynamoelectric machines, especially turbosets, in which on the nondrive shaft end (NDE) of the machine, whose shaft is galvanically separated by insulating distances (6) from ground, frame and foundation, a current path comprising a contact device (18) and a capacitor (19) connected to it in series is provided between the shaft and a machine frame, wherein on the nondrive shaft end (NDE) a resistor (20) is connected between the shaft and the machine frame in parallel to capacitor (19).

2. Arrangement according to claim 1, wherein the resistance value of the resistor (20) is between 100 and 10,000 ohms, and the capacitance of capacitor (19) is between 1 and 30 microfarads and is measured within these boundaries so that a circulating current formed by the shaft grounding on the drive end (DE) from the direct-axis voltage of the generator is limited to a harmless amount by the parallel connection of the capacitor (19) and the resistor (20).

3. Arrangement according to claim 1 or 2, comprising a fuse element (21) connected in the current path.

4. Arrangement according to claim 1, comprising an additional grounding (7) provided on the shaft end on the drive end (DE).

5. Arrangement according to claim 1, comprising a current transformer provided on the shaft for picking up the shaft current.

6. Arrangement according to one of claims 4 or 5, wherein the current path on the nondrive end (NDE) is provided with an analysis unit (28) for monitoring the operating safety and operating capability of the shaft grounding.

7. Arrangement according to claim 6, wherein a first signal ($E_U$), which appears between the contact device (18) and ground (5), and a second signal ($E_I$), which indicates the total grounding current flowing on the nondrive end of the electrical machine by the contact device (18), are fed to the analysis unit (28).

8. Arrangement according to claim 7, comprising a low-inductance shunt (24) provided in the current path on the nondrive end to indicate said grounding current.

9. Arrangement according to claim 7, wherein signals ($E_U$, $E_I$) are fed to a filter arrangement (31-34) with comparators (36-39) connected in series, an evaluation logic (41) and output units (42-46).

10. Arrangement according to claim 9, wherein the first signal ($E_U$), after preliminary wideband amplification in an amplifier (29), is separated into machine-typical frequency components ($E_{DC}$, $E_{fN}$, $E_{3fN}$, $E_{HF}$), the peak value ($E_{Ipeak}$) of the second signal ($E_I$) is determined and then each of these values is itself compared with a reference value and then analyzed in the evaluation logic (41).

11. Arrangement according to claim 10, wherein a first filter (31) exhibits a low pass characteristic and the direct current component ($E_{DC}$) is provided as the output signal and a second filter (32) is a bandpass filter tuned to the line frequency, a third filter (33) is a bandpass filter tuned to triple the line frequency, and wherein a fourth filter (34) is provided for filtering out the higher frequency components ($E_{HF}$).

12. Arrangement according to claim 9, comprising means (47) for interlocking the analysis during startup and shutdown of the electrical machine (2).

13. Arrangement according to claim 6, wherein the measured and monitored values typical for shaft grounding are relayed by a data transmission device (48) to a mainframe (49).

14. Arrangement according to claim 2, wherein the resistance value of the resistor (20) is between 400 and 1000 ohms.

15. Arrangement according to claim 3, wherein said fuse element comprises a time-lag fuse with a low threshold current.

16. Arrangement according to claim 5, wherein said current transformer comprises a Rogouski coil (23) and is provided on the drive end (DE) of the machine.

* * * * *